(12) United States Patent
Chan et al.

(10) Patent No.: US 8,745,010 B2
(45) Date of Patent: Jun. 3, 2014

(54) DATA STORAGE AND ARCHIVING SPANNING MULTIPLE DATA STORAGE SYSTEMS

(75) Inventors: Steve Chan, Cupertino, CA (US); Wei Huang, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 75 days.

(21) Appl. No.: 13/445,725

(22) Filed: Apr. 12, 2012

(65) Prior Publication Data

US 2013/0275385 A1   Oct. 17, 2013

(51) Int. Cl.
*G06F 17/00*   (2006.01)

(52) U.S. Cl.
USPC ............ 707/670; 707/640; 707/661; 711/100

(58) Field of Classification Search
None
See application file for complete search history.

(56) References Cited

U.S. PATENT DOCUMENTS

| | | | |
|---|---|---|---|
| 7,613,747 B1 * | 11/2009 | Thakur et al. ................. | 707/640 |
| 8,463,825 B1 * | 6/2013 | Harty et al. ................... | 707/813 |
| 8,489,930 B1 * | 7/2013 | Sim-Tang ..................... | 714/38.1 |
| 2002/0112008 A1 * | 8/2002 | Christenson et al. ......... | 709/206 |
| 2005/0138081 A1 | 6/2005 | Alshab et al. | |
| 2005/0203962 A1 * | 9/2005 | Zhou et al. .................... | 707/200 |
| 2008/0034019 A1 | 2/2008 | Cisler et al. | |
| 2008/0189352 A1 | 8/2008 | Mitchell et al. | |
| 2008/0307020 A1 | 12/2008 | Ko et al. | |
| 2009/0166839 A1 * | 7/2009 | Suzuki et al. ................. | 257/686 |
| 2010/0235410 A1 * | 9/2010 | Apacible et al. .............. | 707/812 |
| 2010/0241614 A1 * | 9/2010 | Shaull et al. .................. | 707/649 |
| 2011/0010623 A1 | 1/2011 | Vanslette et al. | |
| 2011/0238935 A1 * | 9/2011 | Meehan ........................ | 711/162 |
| 2011/0307451 A1 * | 12/2011 | El Haddi et al. .............. | 707/673 |
| 2012/0079221 A1 * | 3/2012 | Sivasubramanian et al. . | 711/162 |
| 2012/0173822 A1 * | 7/2012 | Testardi et al. ............... | 711/135 |
| 2013/0067587 A1 * | 3/2013 | Leet et al. ....................... | 726/26 |
| 2013/0110779 A1 * | 5/2013 | Taylor et al. .................. | 707/624 |
| 2013/0133082 A1 * | 5/2013 | Read et al. ...................... | 726/27 |
| 2013/0166839 A1 * | 6/2013 | Burton et al. ................. | 711/114 |
| 2013/0198296 A1 * | 8/2013 | Roy et al. ...................... | 709/206 |

* cited by examiner

*Primary Examiner* — Hung Le (57) ABSTRACT

Mutable portions of data are stored in a first storage system and immutable portions of the data are stored in a second storage system. Immutable portions and mutable portions of the data associated with the same time period are initially archived. After a period of time since the initial archiving, the mutable portions of the data from the first storage system that have been modified are supplemental archived. Integrity verifications of successfully performing the initial archiving and supplemental archiving are stored.

19 Claims, 6 Drawing Sheets

DATA STORAGE AND ARCHIVING SPANNING MULTIPLE DATA STORAGE SYSTEMS

BACKGROUND

Conventional data storage systems often backup and archive data in case of loss of live data. In the event of data loss, the data is recovered from the backup or archived data. In simple systems, such as a home personal computer (PC), backups of important data may be periodically performed to a local external hard drive or to remote storage, such as on a cloud. In case of a hard drive failure on the PC, the PC is fixed and the data is restored from the backup. In more complex systems, archiving may be performed for large amounts of data and data storage requirements are considerable. For example, environments generating millions of entries and terabytes of data daily are not uncommon and these environments may use multiple storage systems to store and archive data. Managing archiving processes for this amount of data across multiple storage systems can become a complicated undertaking.

BRIEF DESCRIPTION OF DRAWINGS

The embodiments are described in detail in the following description with reference to the following figures.

DETAILED DESCRIPTION

For simplicity and illustrative purposes, the principles of embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

A system stores data across multiple different types of data storage systems and generates archives of the data stored in the different data storage systems. For example, the data may be stored in a database storage system and a flat file storage system, and the system may archive related data from the different storage systems. The data may include immutable (write-once) portions stored in a first storage system and a mutable (editable data; multiple writes and edits) portions stored in a second storage system, and the system may archive the related immutable and mutable portions of the data from both storage systems. Also, the system may perform multiple processes to provide data integrity when data is archived and restored across the different data storage systems even if the data storage systems have no knowledge of each other.

An example of the type of data stored in the data storage systems is event data. An event is an instance of data collected and stored at the data storage system. The event may be associated with or describe an activity or action that was performed. In general, an event is generated once and does not change afterwards. The event data includes one or more events. The event data may be comprised of log data, which can be generated by various sources (including devices and applications), and can be in any format. An event can be, for example, an entry in a log file, an entry in a syslog server, an alert, an alarm, a network packet, an email, a notification, etc. The event data may include metadata describing the event data, such as information about the source, type of transaction, etc. The metadata may include time attributes comprised of Manager Receipt Time (MRT) and Event Receipt Time (ERT). MRT is when the event is received by the system and ERT is when the event happened. ERT and MRT may be fields in the event schema. ERT or MRT may be used in queries to limit the search results to a desired time frame.

In one example, the event data may be correlated and analyzed to identify network security threats. A security event is a type of event and is any activity that can be analyzed to determine if it is associated with a security threat. The activity may be associated with a user, also referred to as an actor, to identify the security threat and the cause of the security threat. Activities may include logins, logouts, sending data over a network, sending emails, accessing applications, reading or writing data, etc. A security threat includes activity determined to be indicative of suspicious or inappropriate behavior, which may be performed over a network or on systems connected to a network. Common security threats, by way of example, are user attempts to gain unauthorized access to confidential information, such as social security numbers, credit card numbers, etc., over a network.

The data sources for the events may include network devices, applications or other types of data sources described below operable to provide event data that may be used to identify network security threats. Event data is data describing events. Event data may be captured in logs or messages generated by the data sources. For example, intrusion detection systems (IDSs), intrusion prevention systems (IPSs), vulnerability assessment tools, firewalls, anti-virus tools, anti-spam tools, and encryption tools may generate logs describing activities performed by the source. Event data may be provided, for example, by entries in a log file or a syslog server, alerts, alarms, network packets, emails, or notification pages.

Event data can include information about the device or application that generated the event. The event source is a network endpoint identifier (e.g., an IP address or Media Access Control (MAC) address) and/or a description of the source, possibly including information about the product's vendor and version. The time attributes, source information and other information is used to correlate events with a user and analyze events for security threats.

Figure 1:
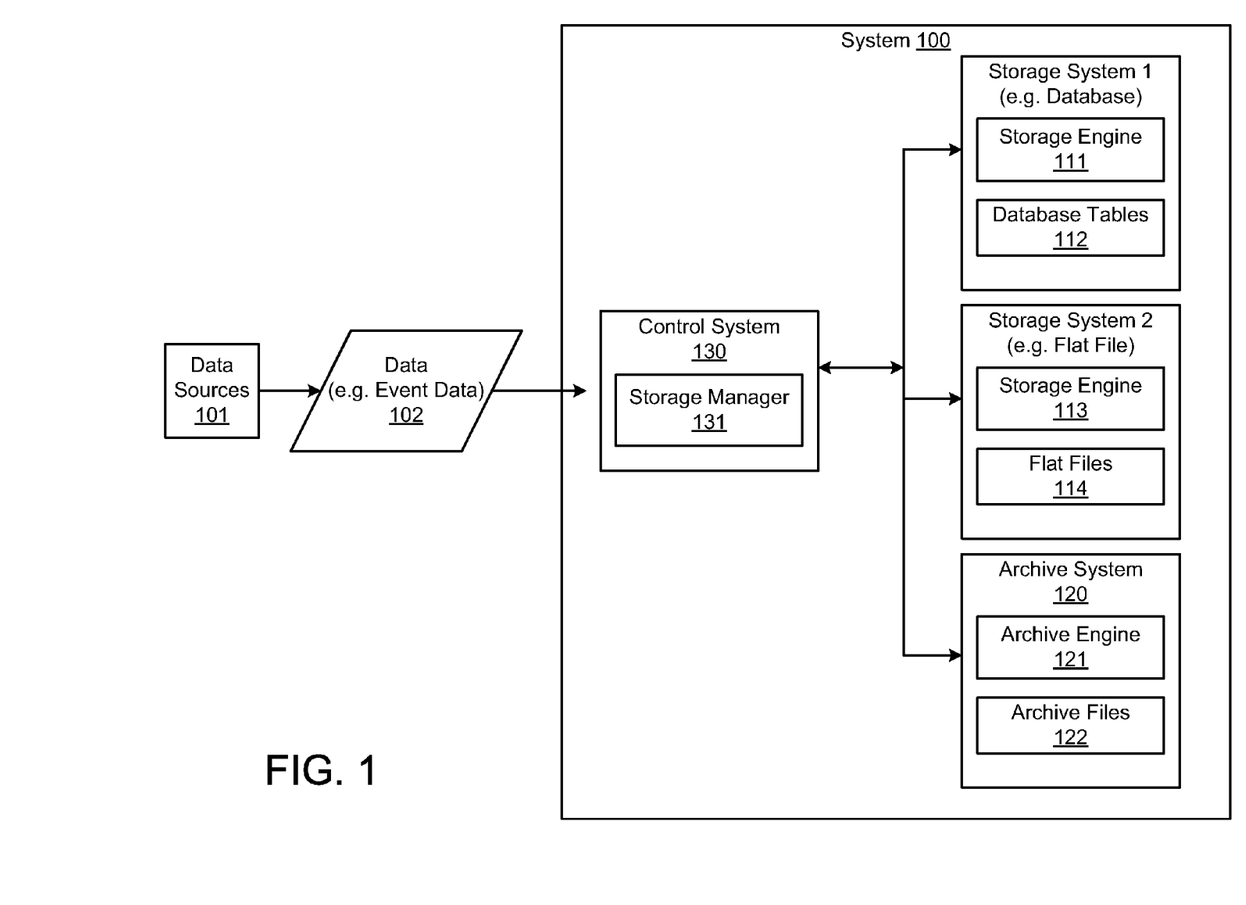
FIG. 1 illustrates an example of a system to store and archive data across multiple storage systems.

FIG. 1 illustrates a system 100 that may be used to store, retrieve and archive data. The system 100 receives data 102 from one or data sources 101. The data may include event data or other types of data. The system 100 stores the data in multiple storage systems, such as storage systems 1 and 2. The system 100 also archives the data in archive system 120. The system 100 may include more than two storage systems to store the data. Also, the storage systems may include different types of storage systems which may store the data in different types of data structures. For example, storage system 1 may be a database system storing the data in database tables 112 for a database, and storage system 2 may be a flat file storage system storing the data in flat files 114. The flat files 114 may be text files. The flat files 114 may primarily include text but may also include binary data. The flat files 114 may be delimited and may be viewed by a user in a text editor to view the data. Each storage system may include a storage engine, such as storage engines 111 and 113 for storage systems 1 and 2 respectively. The storage engines 111 and 113 may be operable to read, write, update and delete data stored in their data structures.

The system 100 also includes the archive system 120 that archives the data and may store the archived data in archive files 122. An archive engine 121 may perform the archiving. The archiving may include compressing data for storage in an archive file and retrieving and decompressing the archived data if a restore is needed. Archiving may include storing data from the storage systems 1 and 2 in a separate data storage device in the archive system 120, for example, for long-term retention. For example, data may be purged from the storage system 1 and 2 if disk space is low, and the data may be archived before being purged.

The system 100 also includes a control system 130 including a storage manager 131. The storage manager 131 stores the data 102 received at the system 100 in one or more of the storage systems 1 and 2. In one example, selects a storage system for storing the data 102 based on the type of data. For example, if the data 102 is immutable data, it is stored in the storage system 2 in a flat file. If the data 102 is mutable data, it is stored in the storage system 1. Immutable data is write once. Mutable data may be edited after is written, so it is write more than once. The data 102 may include mutable and immutable portions and the storage manager 131 identifies whether the data is mutable or immutable and sends the data to the corresponding storage system for storage.

The storage manager 131 also facilitates archiving of the data 102 by the archive system 120. For example, the storage manager 131 identifies the data to be archived and identifies the storage system storing the data to be archived. The storage manager 131 retrieves the data to be archived from the corresponding storage system and sends the data to the archive system 120 for archiving. Also, data may be restored by the system 100. Techniques may be employed to provide data integrity for the archived and restored data. Examples of methods for storing and archiving data and restoring archived data are described in further detail below.

Figure 2:
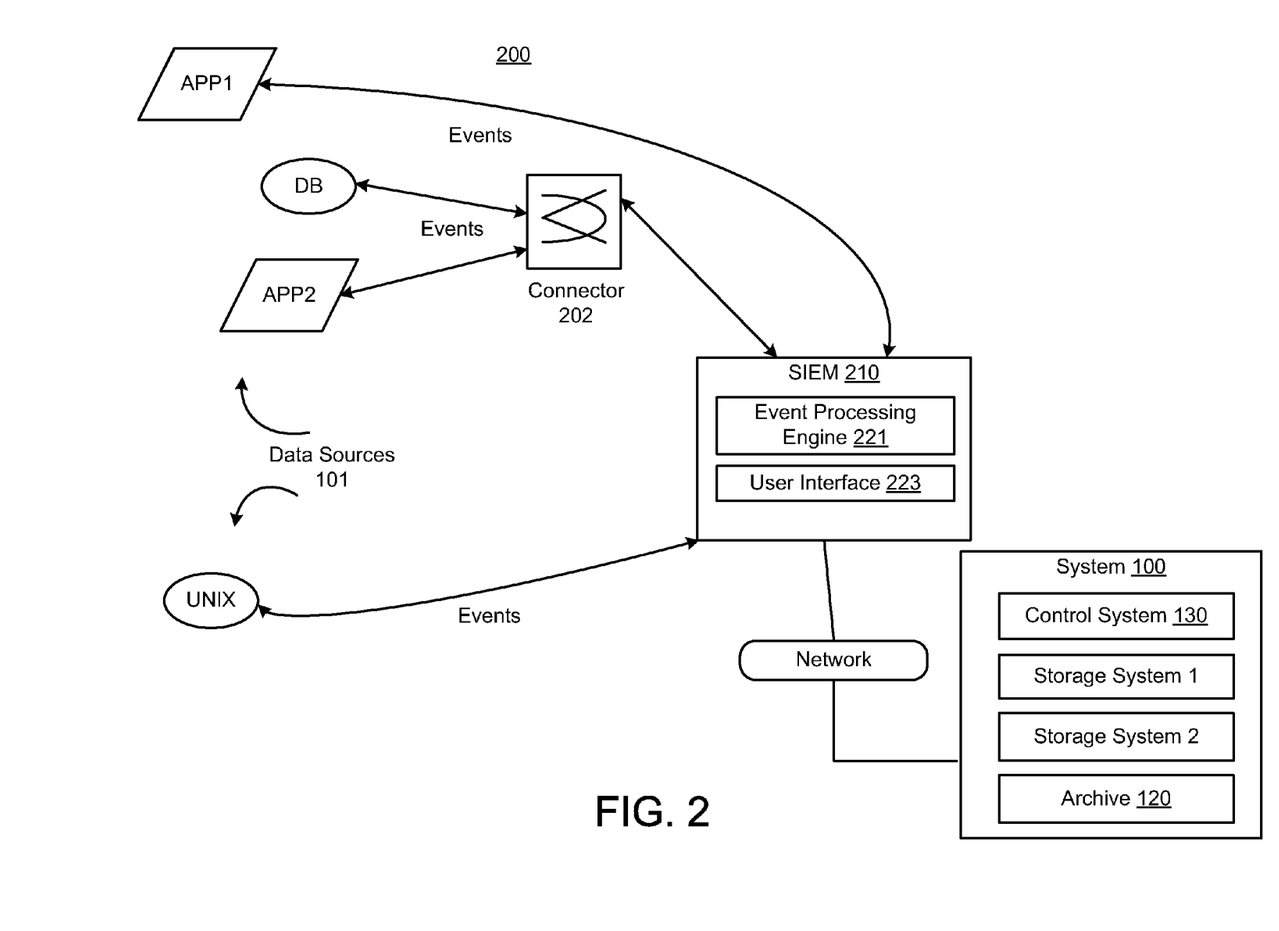
FIG. 2 illustrates an example of an environment including an information and event management system.

FIG. 2 illustrates an example of an environment 200 including security information and event management system (SIEM) 210. The system 100 shown in FIG. 1 may be included in the SIEM 210 to store and archive event data and restore event data as needed. For example, the SIEM 210 receives the event data and sends the event data, for example, via the network, to the system 100 to store the event data in the data storage systems 1 and 2. Data may also be archived by the archiving system 120. The SIEM 210 processes the event data, which may include real-time event processing. The SIEM 210 may process the event data to determine network-related conditions, such as network security threats. Also, the SIEM 210 is described as a security information and event management system by way of example. The SIEM 210 is an information and event management system, and it may perform event data processing related to network security as an example. It is operable to perform event data processing for events not related to network security. The environment 200 includes the data sources 101 generating event data for events (shown as data 102 in FIG. 1), which are collected by the SIEM 210 and stored in the system 100.

The data sources 101 may include network devices, applications or other types of data sources operable to provide event data that may be analyzed. Event data may be captured in logs or messages generated by the data sources 101. For example, intrusion detection systems (IDSs), intrusion prevention systems (IPSs), vulnerability assessment tools, firewalls, anti-virus tools, anti-spam tools, encryption tools, and business applications may generate logs describing activities performed by the data source. Event data is retrieved from the logs and stored in the system 100. Event data may be provided, for example, by entries in a log file or a syslog server, alerts, alarms, network packets, emails, or notification pages. The data sources 101 may send messages to the SIEM 210 including event data.

Event data includes metadata that may include information about the source that generated the event and information describing the event. For example, the event data may identify the event as a user login or a credit card transaction. Other metadata may include ERT and MRT. The event data may describe the source, such as an event source is a network endpoint identifier (e.g., an IP address or Media Access Control (MAC) address) and/or a description of the source, possibly including information about the product's vendor and version. The data/time stamp, source information and other information may then be used for correlation performed by the event processing engine 221. The event data may include meta data for the event, such as when it took place, where it took place, the user involved, etc.

Examples of the data sources 101 providing the event data may include Database (DB), UNIX, App1 and App2. DB and UNIX are systems that include network devices, such as servers, and generate event data. App1 and App2 are applications that generate event data. App1 and App2 may be business applications, such as financial applications for credit card and stock transactions, IT applications, human resource applications, or any other type of applications.

Other examples of data sources 101 may include security detection and proxy systems, access and policy controls, core service logs and log consolidators, network hardware, encryption devices, and physical security. Examples of security detection and proxy systems include IDSs, IPSs, multi-purpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network devices includes routers and switches. Examples of encryption devices include data security and integrity. Examples of physical security systems include card-key readers, biometrics, burglar alarms, and fire alarms. Other data sources may include data sources that are unrelated to network security.

Connector 202 may include code comprised of machine readable instructions that provide event data from a data source to the SIEM 210. The connector 202 may provide efficient, real-time (or near real-time) local event data capture and filtering from one or more of the data sources 101. The connector 202, for example, collects event data from event logs or messages. The collection of event data is shown as "EVENTS" describing event data from the data sources 101 that is sent to the SIEM 210. Connectors may not be used for all the data sources 101.

The SIEM 210 collects and analyzes the event data. Events can be cross-correlated with rules to create meta-events. Correlation includes, for example, discovering the relationships between events, inferring the significance of those relationships (e.g., by generating metaevents), prioritizing the events and meta-events, and providing a framework for taking action. The SIEM 210, which may be manifested as machine readable instructions executed by computer hardware such as a processor enables aggregation, correlation, detection, and investigative tracking of activities. The system also supports response management, ad-hoc query resolution, reporting and replay for forensic analysis, and graphical visualization of network threats and activity.

The SIEM 210 may include modules that perform the functions described herein. Modules may include hardware and/or machine readable instructions. For example, the modules may include event processing engine 221 and user interface 223. The event processing engine 221 processes events according to rules and instructions. The event processing engine 221, for example, correlates events in accordance with rules, instructions and/or requests. For example, a rule indicates that multiple failed logins from the same user on different machines performed simultaneously or within a short period of time is to generate an alert to a system administrator. Another rule may indicate that two credit card transactions from the same user within the same hour, but from different countries or cities, is an indication of potential fraud. The event processing engine 221 may provide the time, location, and correlations between multiple events when applying the rules.

The user interface 223 may be used for communicating or displaying reports or notifications about events and event processing to users. The user interface 223 may be used to receive queries and provide query results to users. The user interface 223 may include a GUI that is be web-based.

Figure 3:
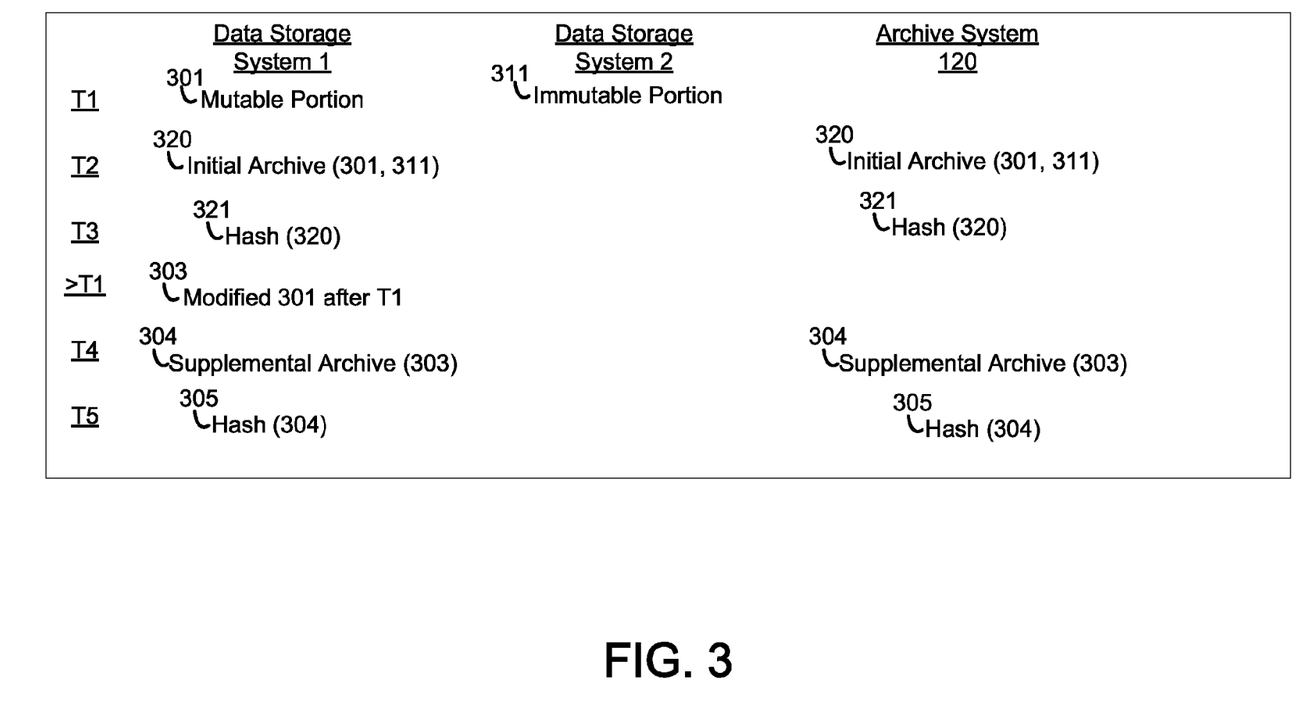
FIG. 3 illustrates an example of storing and archiving data across multiple storage systems.

FIG. 3 shows some examples of data stored in the storage systems 1 and 2 and the archive system 120 of FIG. 1. FIG. 3 is also used to describe methods 300 and 400 discussed below. T1-T5 in FIG. 3 represents a timeline whereby T1 is the earliest time and T5 is the latest time. T1-T5 are used to show the approximate order of actions; the actions identified as performed at one of the times may not be performed at exactly the same time or in that order.

As shown in FIG. 3, storage system 1, which may be a database storage system, stores mutable portions of data 102 received by the system 100. The data 102 may include event data. The mutable portions are shown as 301 and may be stored by time period. In one example, the time period is one day and each row in the database may include mutable portions of all the event data for a single day. Of course the time periods may be different than a day, such as hourly, weekly, etc. In an example, 301 represents mutable portions of the event data for a specific day. Although not shown, the event data may be continuously stored in the storage system 1 over time as it is received.

Storage system 2 stores immutable portions of the event data. 311 represents the immutable portions of the event data for the same day as 301. Although not shown, the event data may be continuously stored in the storage system 2 over time as it is received and event data for each day is stored. Storing of 301 and 311 may be performed at T1. T1 may be around the time of receipt of 301 and 311 at the system 100.

An initial archive is performed, for example, by the archive system 120 at T2. The initial archive may be performed for the event data corresponding to the same time period (e.g., the same day) that is currently stored in different storage systems. For example, 301 and 311 are archived and the archived data is shown as 320. 320 is stored in the archive system 120 and may also be stored in the storage system 1. If the initial archive is successful, at T3, a hash 321 of the archived mutable and immutable data 320 may be stored in the storage system 1 and in the archive system 120.

After the initial archive, the mutable portion 301 stored in the data storage 1 may be edited. For example, event data in 301 may be modified over time to include annotations about the events subsequent to T1. Other edits may also be performed on the mutable portion 301. The edited mutable portion 301 is shown as 303 and is stored in the storage system 1. At a later time T4, such as 1 month, 3 months, 6 months after T1 or any time before the mutable portions 301 and 303 are purged from the storage system 1, a supplemental archive is performed on 303. 303 is archived, shown as 304, and stored in the storage system 1 and the archive system 120. At T5, a hash 305 of 304 may be stored in the storage system 1 and in the archive system 120. All the data shown in FIG. 3 that are associated with 301 and 311 may include metadata indicating that the data is associated with the same time period, such as the same day. This metadata may be used to retrieve all the initial archived data and supplemental archived data for the time period if a restore needs to be performed for the time period.

Figure 4:
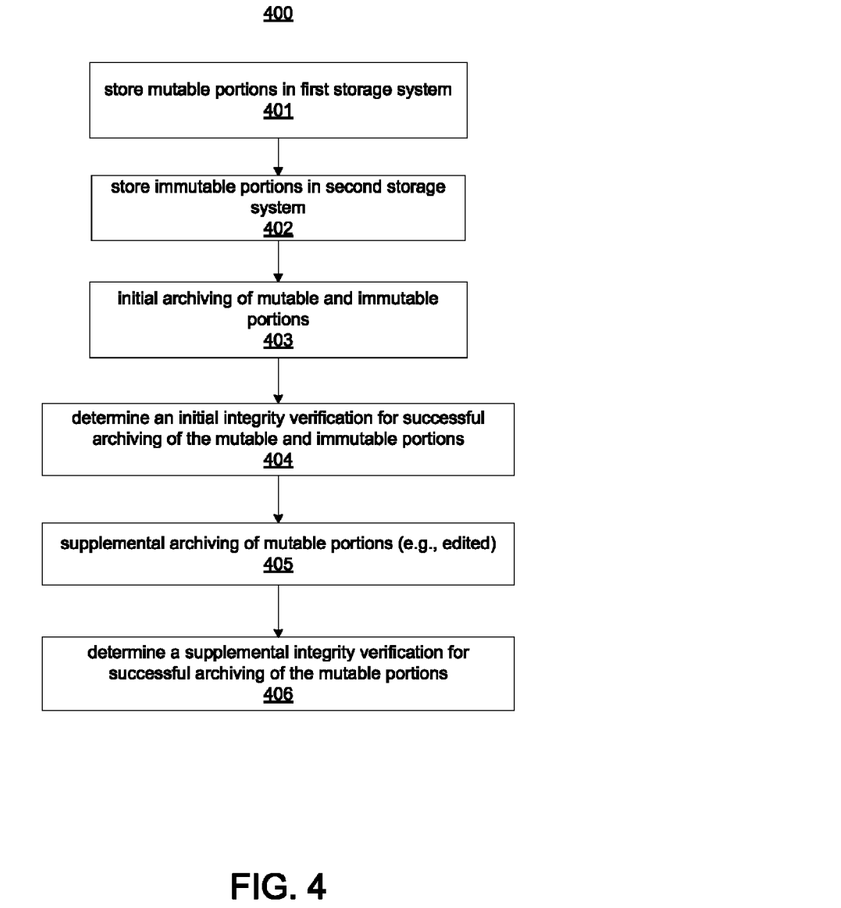
FIG. 4 illustrates an example of a method for archiving data.

FIG. 4 shows an example of a method 400 for archiving data, which may include event data. The methods 400 and 500 are described with respect to the system 100 shown in FIG. 1 and with respect to FIG. 3 by way of example and not limitation. At 401, mutable portions of data are stored in a first storage system and at 402 immutable portions of the data are stored in a second storage system. For example, the storage manager 131 shown in FIG. 1 receives event data from the data sources 102 and identifies mutable and immutable portions of the event data. In one example, the storage manager 131 identifies the different portions based on predetermined fields. For example, fields that indicate ERT, MRT and other fixed attributes may be considered immutable but fields that are used for annotations or event descriptions may be considered mutable. The storage manager 131 invokes storage in the storage systems 1 and 2 for example by identifying and sending mutable portions for storage in the storage system 1 and by identifying and sending immutable portions for storage in the storage system 2. FIG. 3 also shows storing immutable portion 311 in the storage system 2 and storing mutable portion 301 in the storage system 1.

At 403, an initial archiving is performed of the mutable and immutable portions of the data stored in the storage systems 1 and 2. The archiving is performed for the data for the same time period. For example, the storage manager 131 identifies the time period, such as a particular day, and retrieves the event data for that day from the storage systems 1 and 2 and sends it to the archiving system 120 for archiving. The archived data may be stored in an archive file in the archive system 120. FIG. 3 shows the archived data 320 stored in the archive system 120 at T2. The archived data may also be stored in storage system 1.

In one example of the initial archiving, first the immutable event data for the day, which is retrieved for example from the flat file in the storage system 2, is archived. If the archiving of the immutable event data for the day is successful, then the mutable event data for the day retrieved from the storage system 1 is archived. The archiving system 120 may determine if archiving was successful. For example, the archiving may fail due to a variety of reasons, and the archiving system 120 may generate an indication that archiving failed. If successful, an indication may be generated as well. Also, a metadata flag may be set to indicate failed or successful archiving. for an indicate that archiving was successful.

At 404, an initial integrity verification of successfully archiving the mutable and immutable portions associated with the time period is determined and stored with the archived data in the archive system 120 and in the storage system 1 with the mutable portion. In one example, the initial integrity verification is a hash (e.g., SHA-256, MD-5, etc.) of the archived mutable and immutable portions generated at 403. The hash may be calculated if the initial archiving was successful. The hash may be calculated by the storage manager 131 or other system. The hash may be stored with the archived file and with a row in a database in the storage system 1 representing the day of event data. FIG. 3 shows the hash 321 representing the initial integrity verification and stored in the archive system 120 and in the storage system 1.

At 405, a supplemental archiving is performed of the mutable portions of the data from the storage system 1 that are associated with the same time period (e.g., the same day) that was used for the initial archiving. Supplemental archiving may be performed for the mutable portions that have been modified since being stored at 401. The supplemental archiving may be performed at a time subsequent to the initial storing of the mutable portions in the storage system 1, such as 1 month, 3 months, 6 months after that time or any time before the mutable portions are purged from the storage system 1. For example, the storage system 1 may purge data if disk space is low or after a predetermined time period. The supplemental archiving is performed before the purge.

The storage manager 131 may query the data storage system 1 to identify the modified data and send it to the archive system 120 for archiving. The archived data may be stored with the archived data generated in the initial archiving in the archive system 120 and may be stored in the storage system 1 with the archived data generated in the initial archiving.

At 406, a supplemental integrity verification of successfully performing the supplemental archiving is determined if the supplemental archive was successful. The supplemental integrity verification is stored with the archived data in the archive system 120 and in the storage system 1 with the mutable portion. In one example, the supplemental integrity verification is a hash (e.g., SHA-256, MD-5, etc.) of the archived data generated at 405. The hash may be calculated if the initial archiving was successful. The hash may be calculated by the storage manager 131 or other system. The hash may be stored with the archived file and with the row in the database in the storage system 1 representing the day of event data. FIG. 3 shows the hash 305 representing the supplemental integrity verification and stored in the archive system 120 and in the storage system 1.

Figure 5:
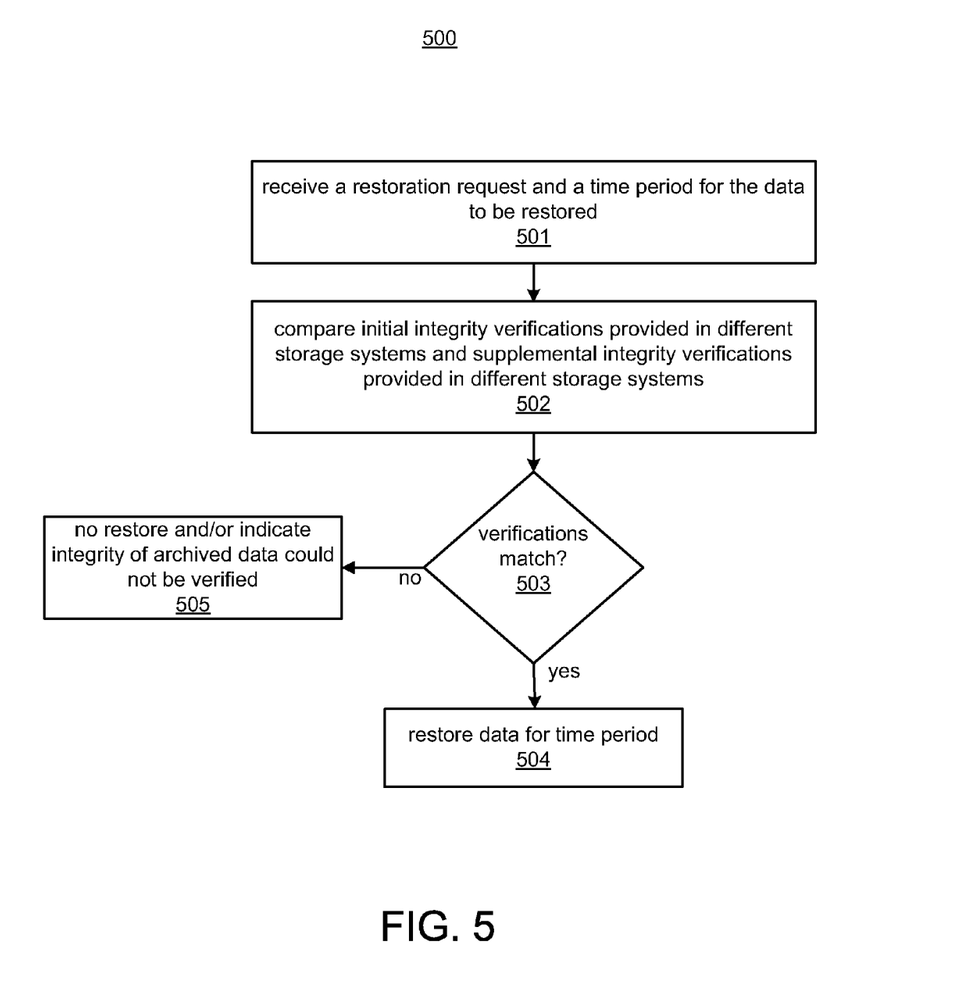
FIG. 5 illustrates an example of a method for restoring archived data.

FIG. 5 illustrates an example of a method 500 for restoring data that may have been archived according to the method 400. At 501, the storage manager 131 may receive a restoration request and a time period for the data to be restored. For example, a user may send a request that requests archived event data for a particular day to be restored.

At 502, the initial integrity verification stored in the archive system 120 and the storage system 1 are compared and the supplemental integrity verification stored in the archive system 120 and the storage system 1 are compared. For example, the storage manager 131 queries the archive system 120 and the storage system 1 for the hashes stored for the time period identified in the request.

At 503, a determination is made as to whether the verifications compared at 502 match. For example, if the initial integrity verification stored in the archive system 120 and the storage system 1 match and the supplemental integrity verification stored in the archive system 120 and the storage system 1 match, the initial archived data for the time period and the supplemental archived data for the time period are restored from the archive system 120 at 504. If one or more of the initial or supplemental integrity verifications do not match then the data may not be restored at 505 or the data may be restored and an indication may be provided that the integrity of the archived data could not be verified.

In some situations, the mutable portions of data may not be modified prior to the time the supplemental archive is to be performed. For example, the database in storage system 1 is queried to determine from timestamps whether any of the mutable portions for a specific data have been modified since a predetermined date. If not, then no supplemental archive is performed. In this situations, the restore may be performed just on the initially archived data and integrity may be verified based on a comparison of the initial integrity verification stored in the archive system 120 and the storage system 1.

Figure 6:
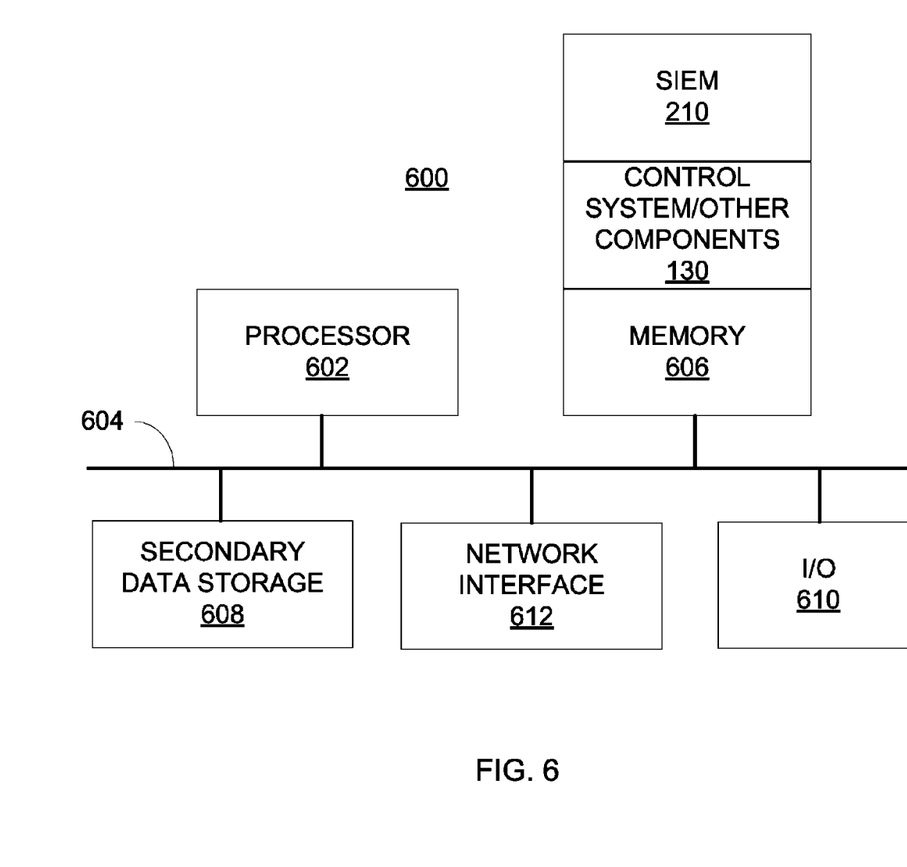
FIG. 6 illustrates an example of a computer system that may be used for the methods and systems.

FIG. 6 shows a computer system 600 that may be used with the systems and methods described herein. The computer system 600 represents a generic platform that includes hardware components that may be in a server or another computer system. The computer system 600 may be used as a platform for one or more of the components of the system 100 shown in FIG. 1 and the SIEM 210 shown in FIG. 2. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 606. The computer system 600 also includes a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. Machine readable instructions for system 100/SIEM 210 are shown as an example as residing in main memory 606 during runtime. For example, the control system 130, other components of the system 100 and components of the SIEM 210 may be embodied in the machine readable instructions and executed by the processor 602. The system 100 and the SIEM 210 may reside on the same server or different servers and can be connected via a network.

The computer system 600 may include an I/O device 610, such as a keyboard, a mouse, a display, etc. The computer system 600 may include a network interface 612 for connecting to a network. Other known electronic components may be added or substituted in the computer system 600.

While the embodiments have been described with reference to examples, various modifications to the described embodiments may be made without departing from the scope of the claimed embodiments.

What is claimed is:

1. A method of archiving data stored in a plurality of data storage systems, the method comprising:
   storing mutable portions of data in a first storage system;
   storing immutable portions of the data in a second storage system;
   performing, by a computer, an initial archiving of immutable portions of the data associated with a time period and of mutable portions of the data associated with the time period, wherein the immutable portions associated with the time period are stored in the second storage system and the mutable portions associated with the time period are stored in the first storage system;

storing an initial integrity verification of successfully archiving the mutable and immutable portions associated with the time period in response to determining the initial archiving is successful;

performing, after a period of time since the initial archiving was performed, a supplemental archiving of the mutable portions of the data from the first storage system that are associated with the time period; and storing a supplemental integrity verification of successfully archiving the mutable portions associated with the time period in response to determining the supplemental archiving is successful.

2. The method of claim 1, comprising:

storing the initially archived mutable and immutable portions associated with the time period in an archive file in an archiving system and in the first storage system; and storing the supplemental archived mutable portions with the archived file and in the first storage system.

3. The method of claim 2, wherein storing an initial integrity verification comprises using a hash function to calculate the initial integrity verification from the mutable and immutable portions associated with the time period; and storing the initial integrity verification with the archive file in the archiving system and with the archived data in the first storage system; and wherein storing a supplemental integrity verification comprises using the hash function to calculate, after the period of time since the initial archiving, the supplemental integrity verification from the mutable portions stored in the first storage system that are associated with the time period and have been modified after being stored; and storing the supplemental integrity verification with the archive file in the archiving system and with the archived data in the first storage system.

4. The method of claim 3, comprising:

restoring the initially archived mutable portions and immutable portions associated with the time period and the supplemental archived mutable portions associated with the time period from the archive system based on comparing the initial integrity verification stored in the archive system and the first storage system and based on comparing the supplemental integrity verification stored in the archive system and the first storage system.

5. The method of claim 4, wherein the restoring comprises:

restoring the mutable portions, including the initially archived mutable portions and the supplemental archived mutable portions, and the immutable portions of data associated with the time period from the archive system if the initial integrity verification stored in the archive system matches the initial integrity verification stored in the first storage system and if the supplemental integrity verification stored in the archive system matches the supplemental integrity verification stored in the first storage system.

6. The method of claim 1, wherein performing supplemental archiving comprises:

determining whether any of the mutable portions of data from the first storage system storage system have been modified after the lapse of the period of time since the initial archiving; and performing the supplemental archiving only on the mutable portions of data from the first storage system storage system that have been modified.

7. The method of claim 1, wherein the first storage system and the second storage system are different types of storage systems storing data in different types of data structures.

8. The method of claim 7, wherein the first storage system is a database storage system and the second storage system is a flat file storage system.

9. The method of claim 1, wherein the data comprises event data including a plurality of transactions performed each day, and each transaction is associated with an action that was performed once.

10. A system to store and archive data comprising:

a processor to receive data and send the data to a first storage system and a second storage system, wherein the first storage system stores mutable portions of the data and the second storage system stores immutable portions of the data, and the first storage system is a database storage system and the second storage system is a flat file storage system, invoke an initial archiving of immutable portions of the data associated with a time period and of mutable portions of the data associated with the time period;

store an initial integrity verification of successfully archiving the mutable and immutable portions associated with the time period in response to determining the initial archiving is successful;

invoke, after a period of time since the initial archiving was performed, a supplemental archiving of the mutable portions of the data from the first storage system that are associated with the time period; and store a supplemental integrity verification of successfully archiving the mutable portions associated with the time period in response to determining the supplemental archiving is successful.

11. The system of claim 10 wherein the initially archived mutable and immutable portions associated with the time period are stored in an archive file in an archiving system and in the first storage system; and the supplemental archived mutable portions are stored with the archived file and in the first storage system.

12. The system of claim 11, wherein a hash function is used to calculate the initial integrity verification from the mutable and immutable portions associated with the time period, and the initial integrity verification is stored with the archive file in the archiving system and with the archived data in the first storage system; and the hash function is used to calculate, after the period of time since the initial archiving, the supplemental integrity verification from the mutable portions stored in the second storage system that are associated with the time period and that have been modified since being stored, and the supplemental integrity verification is stored with the archive file in the archiving system and with the archived data in the first storage system.

13. The system of claim 12, wherein the processor is to invoke restoring the initially archived mutable portions and immutable portions associated with the time period and the supplemental archived mutable portions associated with the time period from the archive system based on comparing the initial integrity verification stored in the archive system and the first storage system and based on comparing the supplemental integrity verification stored in the archive system and the first storage system.

14. An information and event management system comprising:

a system to receive real-time event data from a plurality sources and to store immutable portions of the event data in a second storage system and store mutable portions of the event data in a first storage system, wherein the first storage system is a database storage system and the second storage system is a flat file storage system, and the event data describes events associated with actions performed in a computer network; and a correlation engine to receive the event data from the system and correlate the events in accordance with rules to identify network security threats, wherein the system comprises at least one processor to invoke an initial archiving of immutable portions of the event data associated with a time period and of mutable portions of the event data associated with the time period;

store an initial integrity verification of successfully archiving the mutable and immutable portions associated with the time period in response to determining the initial archiving is successful;

invoke, after a period of time since the initial archiving was performed, a supplemental archiving of the mutable portions of the data from the first storage system that are associated with the time period and have been modified since being initially stored in the first storage system; and store a supplemental integrity verification of successfully archiving the mutable portions associated with the time period in response to determining the supplemental archiving is successful.

15. The information and event management system of claim 14, wherein the at least one processor is to:

store the initially archived mutable and immutable portions associated with the time period in an archive file in an archiving system and in the first storage system; and store the supplemental archived mutable portions with the archived file and in the first storage system.

16. The information and event management system of claim 15, wherein to store the initial integrity verification the at least one processor is to:

use a hash function to calculate the initial integrity verification from the mutable and immutable portions associated with the time period; and storing the initial integrity verification with the archive file in the archiving system and with the archived data in the first storage system; and to store the supplemental integrity verification the at least one processor is to use the hash function to calculate, after the period of time since the initial archiving, the supplemental integrity verification from the mutable portions stored in the first storage system that are associated with the time period and have been modified after being stored; and store the supplemental integrity verification with the archive file in the archiving system and with the archived data in the first storage system.

17. The information and event management system of claim 16, wherein the at least one processor is to:

restore the initially archived mutable portions and immutable portions associated with the time period and the supplemental archived mutable portions associated with the time period from the archive system based on comparing the initial integrity verification stored in the archive system and the first storage system and based on comparing the supplemental integrity verification stored in the archive system and the first storage system.

18. The information and event management system of claim 17, wherein to restore the initially archived mutable portions and immutable portions, the at least one processor is to:

restore the mutable portions, including the initially archived mutable portions and the supplemental archived mutable portions, and the immutable portions of data associated with the time period from the archive system if the initial integrity verification stored in the archive system matches the initial integrity verification stored in the first storage system and if the supplemental integrity verification stored in the archive system matches the supplemental integrity verification stored in the first storage system.

19. The information and event management system of claim 14, wherein the at least one processor is to:

determine whether any of the mutable portions of data from the first storage system storage system have been modified after the lapse of the period of time since the initial archiving; and perform the supplemental archiving only on the mutable portions of data from the first storage system storage system that have been modified.

* * * * *